March 19, 1968     E. J. PEHAM     3,374,299
PLASTIC HAT
Original Filed Feb. 1, 1965     2 Sheets-Sheet 1
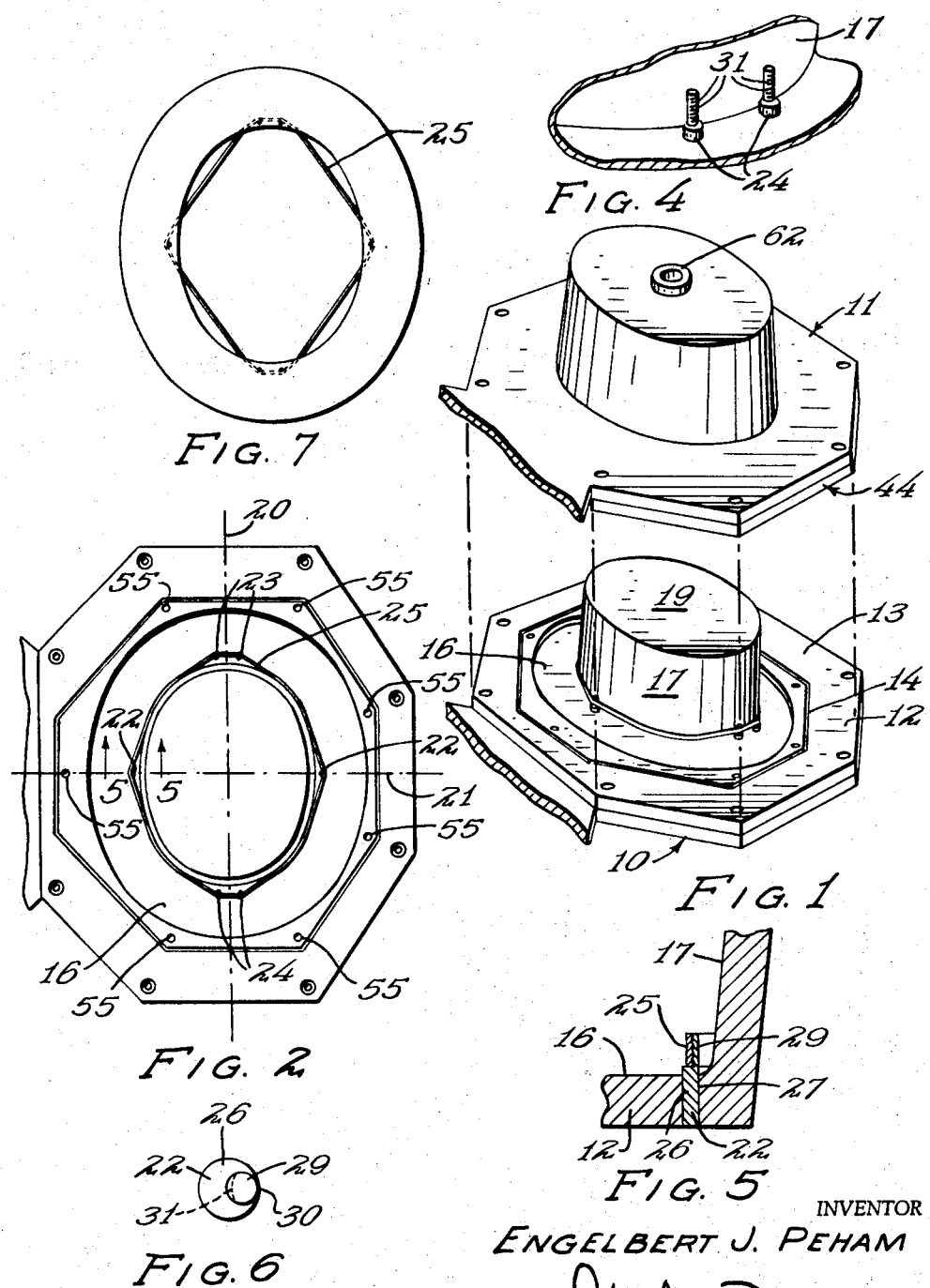
INVENTOR
ENGELBERT J. PEHAM
BY *Robert M. Dunning*
ATTORNEY March 19, 1968     E. J. PEHAM     3,374,299
PLASTIC HAT Original Filed Feb. 1, 1965     2 Sheets-Sheet 2

INVENTOR
ENGELBERT J. PEHAM
BY
ATTORNEY

United States Patent Office 3,374,299
Patented Mar. 19, 1968

3,374,299
PLASTIC HAT
Engelbert J. Peham, St. Paul, Minn., assignor to Peham Plastics Company, St. Paul, Minn., a partnership
Original application Feb. 1, 1965, Ser. No. 429,231, now Patent No. 3,305,874, dated Feb. 28, 1967. Divided and this application Feb. 27, 1967, Ser. No. 618,631
5 Claims. (Cl. 264—45)

ABSTRACT OF THE DISCLOSURE

The method disclosed is for producing objects such as plastic hats having a resilient band embedded in the plastic at spaced areas and normally extending in straight lines between these areas, the resilient band serving to make the hat adaptable to various head sizes and shapes. The method is used in conjunction with a convex male mold and a concave relatively movable female mold defining a mold cavity therebetween. The male mold includes a series of spaced parallel pins extending into the mold cavity at points spaced outwardly of the convex surface thereof. The method employs the steps of stretching an endless resilient band around the convex portion of the male mold and outwardly of the pins. Intermediate portions of the band between the pins are drawn under tension against the male mold. The mold cavity is then filled with plastic. When the molded body is removed from the mold, the portions of the band which have been held under tension against the male mold are free to flex into straight lines between the embedded areas.

This application is a division of my previously filed application for Plastic Hat, filed Feb. 1, 1965 as Ser. No. 429,231, now U.S. Patent No. 3,305,874.

This invnetion relates to an improvement in plastic hats and method of forming the same, and deals particularly with a plastic hat having an interior elastic band adapted to extend around the periphery of the head and anchored at angularly spaced points to the head, and to the method of forming a hat of this type.

Quite a substantial business has been developed in the molding of plastic hats. These hats are different shapes and types as, for example, straw hats having oval shape flat crowns. Hats of this type may, if desired, be provided with special bands and used by persons attending conventions and the like to identify the members attending. Preferably, the hats are molded from other products such as expanded polystyrene, and in actual practice the finished product so closely resembles an actual straw hat as to be virtually indistinguishable therefrom from a short distance. At the same time, they may be produced at relatively low cost.

In order to maintain a low cost of production, it is impractical to mold the hats in all of the hat sizes normally found in the inventory of a hat store. In order to be practical, the hats are usually molded in two or three hat sizes, so that means must be provided to compensate for different shapes and sizes of heads. This can be accomplished reasonably well by means of an elastic band anchored to the body of the hat at several spaced points and under tension to bridge rounded areas of the interior of the hat. This band engages the surface of the head and may be used to support the hat properly on a variety of head sizes up to the size which fills the hat.

Attempts have been made to anchor this elastic band by stapling the band in position. This is a difficult task, due to the fact that the band must be maintained under tension during the stapling operation. Furthermore, the stapling of the band in place is a slow and tedious operation, and even when in place, the band is likely to come loose if extra strain is placed upon the band, as the staples are imbedded in relatively soft plastic.

It has been found that by providing suitable pins or projections on the male mold of the die in position to extend upwardly to the brim of the hat, and by stretching the elastic band about these pins, spaced areas of the band will be imbedded directly in the body of the plastic to hold the band in place. At the completion of the molding operation, the hat is removed from the die, the pins withdrawing from the body of the hat and leaving only small inconspicuous apertures. By this method, spaced areas of the band are actually imbedded between the inner and outer surfaces of the wall of the hat, and when the hat is removed from the mold, the elastic is stretched tightly from one point of attachment to the next, extending as a cord beween portions of the curved interior of the hat.

In producing the hats, a male and female mold is used, which usually actually comprises a multiple mold including two or more cavities. The male mold defines a surface similar to the inner surface of the crown of the hat, including the side wall of the crown, and defines the lower surface of the hat brim, as well as a portion of the periphery of the brim. The female portion of the mold fits in spaced relation to the male portion and defines the outer surface of the crown and upper surface of the brim, as well as a portion of the peripheral surface of the brim. The pins which are employed preferably extend upwardly from the undersurface of the male mold in closely spaced relation to the wall of the crown, so that the ends of these pins extend into the wall of the crown or between the areas forming the crown in the male and female molds. The resilient band or tape is spaced to extend outwardly of the angularly spaced pins, portions of the elastic tape near the pins being in spaced relation to the outer surface of the male mold, and other areas of the tape closely following the surface of the male mold in surface contact therewith. When the plastic is inserted into the mold and expanded to fill the mold, the portions of the tape which are closely adjacent the location of the pins becomes imbedded in the wall of the head crown, while the intermediate portions of the elastic tape which were in face contact with the outer surface of the male mold will be inwardly of the wall of the crown when the hat is removed from the mold. Due to the fact that the hat was molded while the elastic tape was in slightly stretched form, the portion of the elastic tape which is exposed on the inner surface of the crown will extend in a straight line from one point of attachment to another, permitting the hat to be comfortably worn by a person whose head is somewhat smaller in size than the maximum size of head which would fit into the hat.

A further feature of the present invention resides in supporting the band with its lower edge spaced above the undersurface of the male mold so that the tape is anchored at a point spaced on the lower edge of the brim. This is accomplished by providing a shoulder on each of the pins supporting the tape so as to locate the lower edge of the tape on a plane parallel with the undersurface of the hat brim but spaced upwardly therefrom.

A further feature of the present invention resides in providing the supporting pins in such a manner that a relatively short portion of the tape is anchored in the side walls of the hat crown while a relatively greater length of tape is imbedded in the hat at the front and rear portions of the crown wall. As a result, the elastic tape engages the head comfortably, and a wearer can accomplish the best results.

A further feature of the present invention lies in the provision of a method of forming a hat which includes imbedding spaced areas of an elastic band in the wall of the crown of the hat during a molding operation, and while the elastic tape is under tension.

These and other objects and novel features of the present invention will be more clearly and fully set forth in the following specification and claims:

In the drawings forming a part of the specification,

FIGURE 1 is a diagrammatic expanded view of a pair of male and female mold portions prior to the molding operation.

FIGURE 2 is a plan view of the male mold portion showing the manner in which the elastic tape is mounted thereupon prior to the molding operation.

FIGURE 4 is an enlarged perspective view of a portion of the male mold showing a pair of tape supporting pins in position thereupon.

FIGURE 5 is a vertical sectional view through a detailed portion of the male mold, the position of the section being indicated by the line 5—5 of FIGURE 2.

FIGURE 6 is an enlarged top view of one of the tape supporting pins.

FIGURE 7 is a bottom plan view of one of the hats formed in the molds illustrated.

Figure 3:
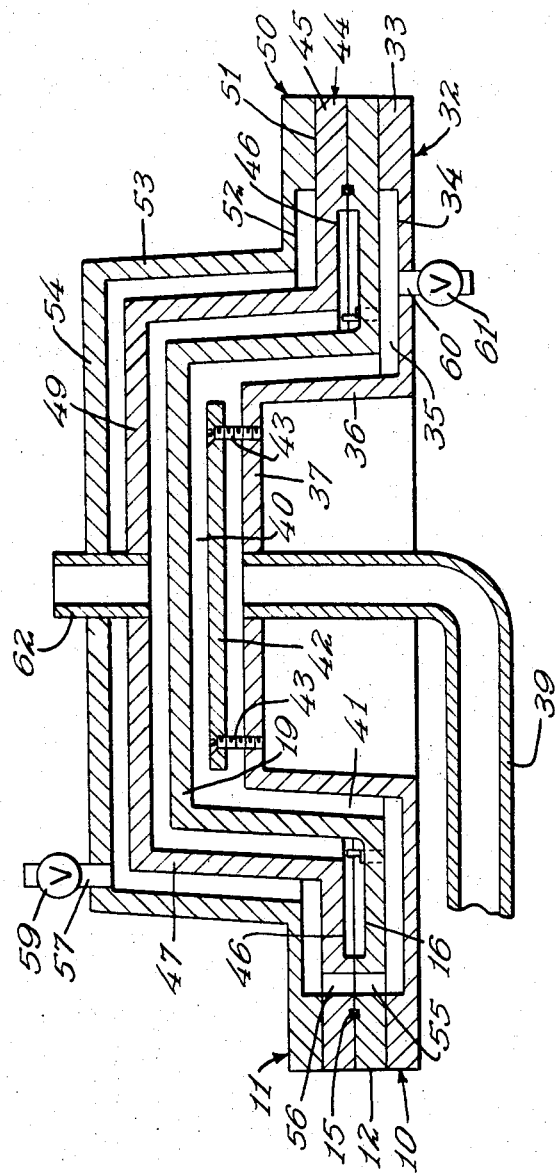
FIGURE 3 is a vertical sectional view through the mold in closed position thereof.

The present has been disclosed in conjunction with a male and female mold of the type used to produce a hat similar to a flat crown straw hat, in view of the fact that this style has proven extremely popular from a commercial standpoint. However, it should be understood that the particular style of hat illustrated is merely for the purpose of illustration, and not to form a limitation to the style of hat being made. For example, hats similar to helmets of one type or another have also been produced in considerable volume, and molds for hats of other shapes are under consideration.

The molds illustrated include a male mold portion 10, and a female mold portion which is indicated in general by the numeral 11. The male mold 10 includes an upper portion 12, the outer portion of which comprises a horizontal flat upper surface 13, which is grooved as indicated at 14. A sealing ring such as is indicated at 15, in FIGURE 3, of the drawings is positioned in the groove 14, to seal against the cooperable surface of the female mold 11.

Inwardly of the mold surface 13 is an oval groove 16, which defines the lower surface of the hat brim. Inwardly of the groove 16 is an upstanding oval wall 17, designed to define the inner surface of the crown of the hat. The upper surface 19, of the crown forming wall 17, is flat to form the undersurface of the top of the hat.

For the purpose of description, the major axis of the oval mold is indicated by the broken line 20, while the minor axis of the oval mold is indicated by the broken line 21. As indicated in FIGURE 2, a pair of pins 22 extend upwardly from the base of the groove 16, in closely spaced relation to the upstanding wall 17, forming the inner wall of the crown and along the minor axis 21. A pair of pins 23 extend upwardly from the base of the groove 16 in closely spaced relation to the forward end of the hat mold, the pins 23 being equally spaced on opposite sides of the major axis 20. A third pair of pins 24 extends upwardly from the base of groove 16, near the rear end of the upstanding wall 17, the pins 24 also being spaced equally on opposite sides of the major axis 20. It is the purpose of the pins 22, 23 and 24 to support an elastic tape or band 25, portions of which are to be imbedded in the molded body of the hat, as will be later described. Due to the fact that there are two (2) pins at the front and rear portions of the mold and one pin at each side, a relatively greater length of the elastic band is embedded in the front and rear portions of the hat than at the sides.

The pins are formed as best illustrated in FIGURES 4, 5 and 6 of the drawings. The pins, such as the pins 22, are shown as having cylindrical shanks 26, which are frictionally engaged in apertures 27, in the upper portion 12, of the male mold 10, and include a smaller diameter shanks 29, projection upwardly therefrom, the smaller diameter portions 29, each having an inner edge 30, which is substantially flush with the periphery of the shank 26. The smaller diameter pins 29 are provided with serrations 31, extending horizontally across the surface of the pin most remote from the upstanding wall 17, of the male mold portion. The male mold portion 10 also includes a lower portion 32, which is perhaps best illustrated in FIGURE 3 of the drawings. The lower portion 32 includes a peripheral area 33 about the entire periphery of the mold 10, which is in face contact and sealed relation to the undersurface of the upper portion 12 of the male mold. The upper surface of the lower portion 32, is grooved as indicated at 34, inwardly of the peripheral portion to provide a steam and water chamber 35, between the portions 12 and 32, of the male mold. The lower portion 32 follows the general confirmation of the upper portion 12, including a upstanding wall 36 spaced inwardly of the inner surface of the wall 17, and a top panel 37, which is spaced substantially below the undersurface of the top panel 19, of the crown forming portion of the mold. A conduit 39 is secured to the top mold portion 37, of the lower section of the male mold, with the interior of the conduit communicating with the chamber 40, between the upper portions 19 and 37 of the male mold, the chamber 41 between the upstanding walls 17 and 36 of the two mold portions, and the chamber 35 between the flat portions of the mold sections. In effect, the chambers 35, 40 and 41 form a single steam and water chamber. A baffle plate 42 is secured in spaced relation to the top portions 19 and 37, of the upper and lower sections of the male mold, and are held in position on the top portion 37 by screws 43, or other suitable means.

The purpose of the baffle 42, is to deflect the water and steam entering the interior of the male portion 10 of the mold, and to more fairly disperse the heating or cooling fluid.

The upper or female mold 11 includes a lower portion indicated in general by the numeral 44, having a peripheral area 45 designed to seat against the upper surface of the peripheral portion of the male mold. The undersurface of the lower mold portion 44 is grooved as indicated at 46, in opposed relation to the groove 16 in the male mold, the space between the bases of the grooves 16 and 46 forming the brim of the hat. The mold portion 45 includes an upstanding portion 47, which is in spaced relation to the wall 17, so as to provide a space in which the wall of the crown is formed. The mold portion 44 also includes a top portion 49, which is in spaced relation to the top portion 19 of the female mold to form the top of the hat crown.

The female mold portion 11 also includes an upper portion which is indicated in general by the numeral 50. This upper portion has a peripheral undersurface 51, which lies in face contact with the upper surface of the lower portion 44, and is sealed with respect thereto. Inwardly of the peripheral portion 51, the undersurface of the mold portion 50 is grooved as indicated at 52 to form a stream and water chamber between the upper and lower portions 50 and 44. The upper mold portion 50 also includes an upstanding wall 53, which is spaced outwardly of the wall 47, and a top portion 54, which is spaced above the top portion 49 of the mold section 44. In other words, both the male and female portions of the mold are hollow so that steam and water may be circulated therethrough.

In the particular arrangement illustrated, the hollow interior of the male mold 10 is connected to the hollow interior of the female mold portion 11, so that the two parts of the mold may both be heated and cooled from a single inlet. As indicated at the left side in FIGURE 3 of the drawings, the upper portion 12 of the male mold is provided with vertical passages 55, which register with similarly spaced passages 56 in the lower portion 45, of the female mold 11. These passages extend through the sealed areas of the two mold parts and are spaced about the periphery of the hat as indicated at 55, in FIGURE 2 of the drawings.

In order to permit the circulation of fluid to the molds, the female mold portion 11 is provided with a return conduit 57, closed by a valve 59.

Steam which is introduced to the conduit 39, into the male portion of the mold, is distributed through the male portion of the mold and flows upwardly through the passages 55 and 56 to heat the interior of the upper portion of the mold. This may be accomplished when the valve 59 is in closed position. However, during the cooling of the mold, water may be introduced through the same conduit 39, and into the hollow interior of the male portion of the mold before flowing upwardly through the passages 55 and 56 into the hollow interior female mold. To permit the circulation of the cooling water, the valve 59 is open to provide a vent and also to permit the recirculation of the cooling water to the cooling water reservoir.

In order to permit the draining of the cooling water from the mold, the conduit 60 communicates with the hollow interior of the male portion of the mold at the lower extremity thereof, the conduit being controlled by the valve 61. At the completion of the cooling operation, the water is drained from the mold by the opening of the drain valve 61.

A sleeve 62 extends through the lower and upper portions of the female mold, 44 and 50, to communicate with the chamber within the mold between the male and female portions thereof. The plastic is introduced to the mold cavity through a sleeve 62, in an amount necessary to completely fill the mold when in its expanded form. Having described the mold, the method of operation will now be described.

While the male and female portions of the mold are in spaced relation, the elastic tape 25 is applied to the male portion of the mold, the band or tape extending outwardly of the pins 22, 23 and 24, and the intermediate portions of the tape extending in face contact with the upstanding wall portion 17, of the mold. In the insertion of the tape or band 25, it should be noted that the band is substantially equal in width to the vertical height of the reduced diameter pins 29 and, as is best shown in FIGURE 5, the inner surface of the band 25 is in engagement with the serrated portion of the pins 29. The shoulder which is formed by the upper ends of the larger diameter shanks 26, engages the lower edge of the tape 25 and supports the tape spaced above the lower surface of the hat brim, or spaced above the upper surface of the grooved portion 16, of the male mold.

After the band has been inserted in place, the mold sections are brought together to form a mold cavity, and the molding material, such as polystyrene, is injected into the mold cavity through the sleeve 62. As the method of filling the mold is well known in the art, this procedure will not be described in detail.

Steam is then introduced into the conduit 39, to fill the interior of the hollow mold section under pressure. This heat causes the plastic to expand to completely fill the mold. During this operation, the plastic material extends between the pins 22, 23 and 24 and the upstanding wall 17, of a male mold, and also extends about the upper ends of the shanks 26, forming the base of the pins, so that portions of the elastic tape are completely imbedded within the body of the hat. However, as areas of the inner surface of the elastic band or tape are in surface contact with the outer surface of the upstanding wall 17, the plastic cannot force its way between the resilient band and the mold wall 17, leaving intermediate areas of the band in face contact with the mold wall 17.

After the heating cycle, the mold is cooled by a cooling cycle during which cooling water is circulated through the conduit 39, into the lower portion of the mold and through the apertures 55 and 56 to the hollow interior of the female portion of the mold 11. Cooling water is circulated through the mold for a predetermined period of time, the valve 59 being opened for this purpose.

At the completion of the cooling operation, the drain valve 21 is opened as the water supply is cut off and the interior of the mold is permitted to drain. The mold is then opened, and the hat may be removed from the male portion of the mold. The hat normally will remain on the male portion of the mold due to the fact that the resilient band 25 is in frictional engagement with the upstanding wall 17 of this portion of the mold, and due to the fact that the band supporting pins are imbedded in the body of the hat. The hat may be detached from the male portion of the mold through any conventional means such as the use of compressed air.

When complete, the resilient band 25 is thus anchored into the body of the hat, usually to opposite sides of the wall of the crown, and to the front and rear of the wall of the crown. The band 25 permits the same hat to properly fit heads of different sizes dues to the fact that the band is spaced inwardly from the inner surface of the wall of the crown between the four spaced points of anchorage. The largest head size which will be accommodated is obviously that which stretches the band 25 against the inner surface of the wall of the crown.

In accordance with the patent statutes, the principal construction and operation of the improvement of plastic hats and method of forming the same, have been described; and while an attempt has been made to set forth the best embodiment thereof, it should be understood that obvious changes may be made within the scope of the following claims, without departing from the spirit of the invention.

I claim:
1. The method of forming a plastic hat having a resilient band incorporated therein through the use of male and female mold portions having a mold cavity therebetween, the mold cavity defining a hat shaped chamber including a crown having a top portion and encircling side walls, the method including the steps of:
   supporting the band under tension on the male portion of the mold with spaced portions of the band spaced outwardly from the side wall of the crown and inwardly of the inner surface of the female mold,
   supporting portions of said band which are intermediate the said space portions in contact with the side wall of the crown of the male mold,
   molding a hat in said mold cavity to embed said spaced portions within the walls of the molded crown of the hat, and
   removing the molded piece from the mold and permitting the intermediate portions of the band to extend in a straight line from one embedded area to the next.

2. The method of forming a plastic hat having a resilient band incorporated therein through the use of a male and female mold having a mold cavity therebetween, the mold cavity defining a hat-shaped chamber including a crown having a top portion and encircling side walls, the male mold portion having a series of parallel pins spaced about the periphery of the crown walls, and extending into the chamber outwardly of the portion of the male mold defining the wall of the crown, the method including the steps of:
   applying a resilient band about the crown wall forming portion of the male mold and outwardly of the parallel pins,
   intermediate portions of the band between spaced pins being held under tension against the crown wall forming portion of the male mold,
   inserting expandable plastic into the mold cavity,
   heating the mold cavity to expand the plastic to fill the mold cavity,
   cooling the mold,
   opening the cooled mold and removing the molded hat from the spaced pins, the intermediate portions of said band extending in substantially straight lines.

3. The method of claim 2, and in which the front and rear portions of the male mold is provided with a pair of spaced pins, and
in which the method includes extending the band about both of the pins of each of said pairs.

4. The method of forming a plastic body having a resilient band incorporated therein through the use of a convex male mold and a relatively movable female mold defining a mold cavity therebetween, the male mold having a series of spaced parallel pins thereon extending into the mold cavity in a direction parallel to the direction of relative motion between said molds, the method including the steps of:
applying an endless resilient band about the convex male mold outwardly of the parallel pins,
intermediate portions of the band between the pins being held under tension against the surface of the convex male mold,
inserting expandable plastic into the mold cavity, and forming a plastic body therein,
opening the mold and removing the molded body from the male mold and spaced pins,
the intermediate portions of the said band extending in substantially straight lines between the embedded portions thereof.

5. The method of claim 4 and including the steps of heating the mold to expand the plastic to fill the mold, and then cooling the mold.

References Cited

UNITED STATES PATENTS 2,746,049  5/1956  Hudson.

ALEXANDER H. BRODMERKEL, *Primary Examiner.*

LEON GARRETT, *Assistant Examiner.*